Patented Mar. 19, 1946

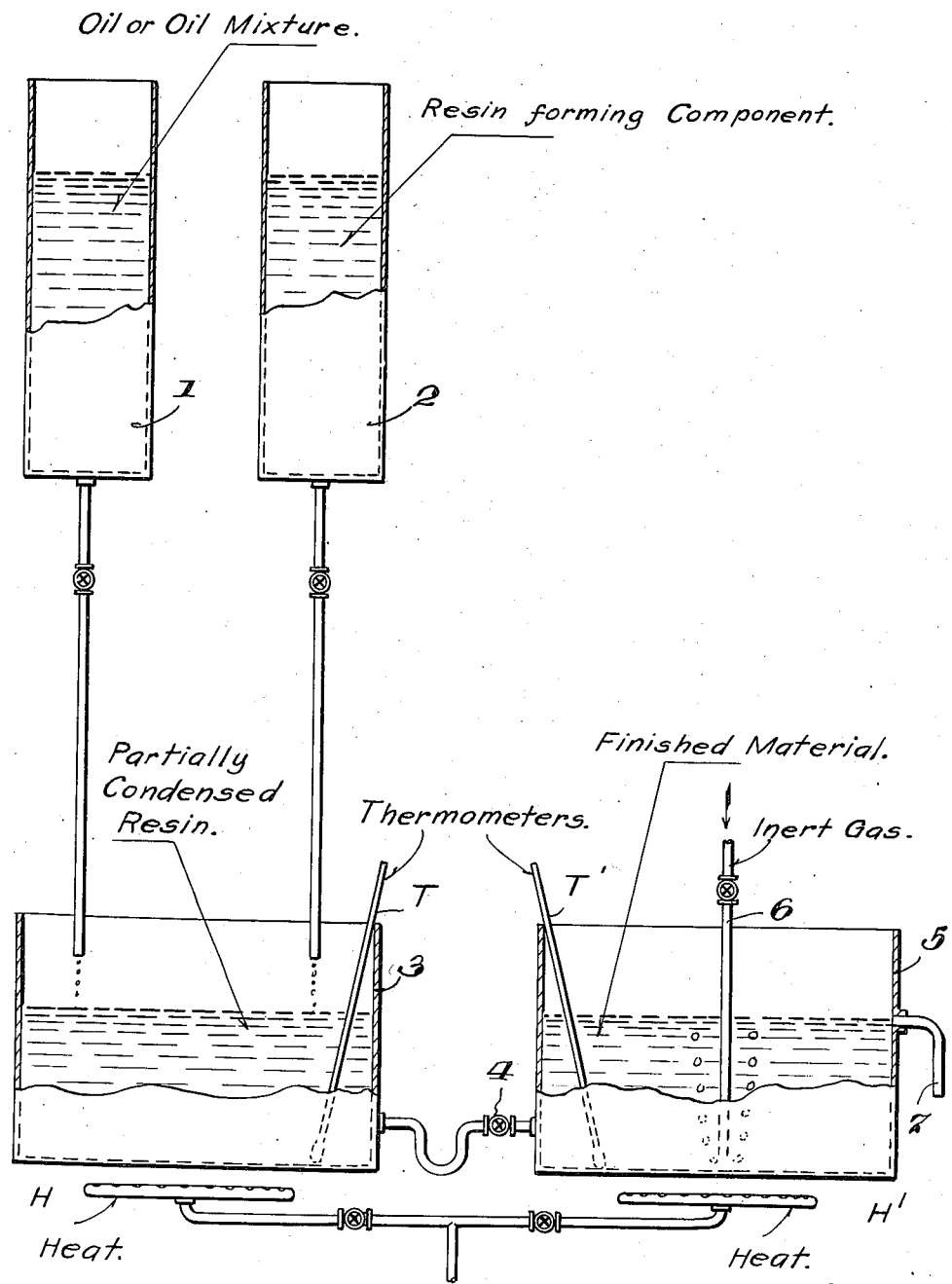

2,396,698

UNITED STATES PATENT OFFICE 2,396,698

PROCESS OF PREPARING ALKYD RESINS

Edward C. Haines, Moorestown, N. J., assignor to Geo. D. Wetherill Varnish Co., Inc., Camden, N. J., a corporation of Pennsylvania Application June 6, 1944, Serial No. 538,937

12 Claims. (Cl. 260—22)

This is a continuation-in-part of Edward C. Haines application, Serial No. 447,809, filed June 20, 1942.

The invention relates to the production of alkyd resins and is more particularly concerned with a process for preparing oil-modified resins in a novel, cheaper, and more expeditious manner.

In the past, it has been found generally difficult to incorporate, under atmosphere pressures, an oil-modifying ingredient into an unmodified alkyd resin to form a homogeneous product unless resort is had to indirect methods or to the formation of intermediate compounds. In other words, in order to disperse the resin formed by the reaction between a polyhydroxy alcohol and a polycarboxylic acid in the oil-modifying agent, it has been generally necessary first to form an intermediate compound by combining part or all of the oil with either part or all of the polyhydroxy alcohol. In some cases, intermediate compounds have been formed by combining part or all of the oil with part or all of the polycarboxylic acid or its anhydride, while in other cases intermediate compounds have been formed containing an excess of one of the ingredients. In the case of glyceryl-phthalate resins, it has been the general practice to replace part or all of the oil with an equivalent mixture of fatty acid and glycerine.

One of the objects of the present invention is to combine the resin-forming component directly with an oil which is normally difficult to combine without employing indirect methods or preparing an intermediate compound.

This is accomplished in accordance with the present invention by providing a continuous method for preparing oil-modified alkyd resins. Essentially, and briefly stated, it has been found that the oil-modifying component may be directly and smoothly combined with the resin-forming component if a uniform mixture of a polyhydroxy alcohol and a polycarboxylic acid (or anhydride) in liquid form, with or without other resinous bodies, as one ingredient, and a fatty oil or oleoresin as a second ingredient, are continuously added in aliquot amounts to a partially resinified reaction mixture of these two ingredients at a suitable combining temperature. Such a continuous process results in a clear, physically homogeneous, partially combined resin which may be used as such. For example, the product of the initial reaction is useful as a modifying ingredient in varnish. On the other hand, as more particularly pointed out hereinafter, this initial reaction mixture may be further processed, as by cooking, either by batch, or in a continuous manner to produce a homogeneous resin of low acid number.

The production of physically homogeneous resins in accordance with the present invention and the distinct advantages resulting from the present process, may be explained, in connection with oil-modified glyceryl phthalate resins as follows:

The chemical combination of glycerine and phthalate anhydride involves an esterification reaction in which water is evolved. This reaction is reversible and the liberation of water, if retained in the mass, will produce an equilibrium at partial esterification, depending upon the concentration of reactants. In a batch process the water of esterification is continuously driven off, is not replaced, and the reaction mass gels or polymerizes as it approaches complete esterification. This may also be true of partially oil-modified alkyds, depending upon the degree of modification.

It is a salient feature of the present invention to maintain equilibrium in the reaction mixture to prevent gel formation. This is accomplished by allowing the reactants to comingle in a continuous manner to cause a continuous evolution in situ of water of esterification. Such a continuous process assures the presence of water at all times in the reaction mixture, regardless of the fact that the reaction temperature is above the boiling point of water, that is, as fast as water is driven off, it is continuously and immediately replaced in amounts sufficient to maintain equilibrium. This inhibits or prevents gel formation or polymerization, thus enabling the oil to react with the partially esterified and/or modified alkyds.

As pointed out hereinafter the amount of water of esterification may be augmented by the continuous addition to the reaction mass of water from an extraneous source. For instance, water may be continuously introduced by first diluting the resin-forming ingredients with water and then continuously adding the thus diluted ingredients to the reaction mass. Also, water may be added by directing a continuous stream of steam through the reaction mass.

In connection with the attainment of equilibrium in oil-glyceryl phthalate mixtures, the following observations should be made:

Oil is soluble in an oil-modified alkyd in an amount depending on the extent of modification. Also oil combines slowly with an oil-modified alkyd at esterification temperatures. A partially esterified oil-modified alkyd, containing many uncombined hydroxyl and carboxyl groups, will combine relatively quickly with more phthalic anhydride and glycerine or with a partially esterified compound of the two. At esterification temperatures water will be evolved during such addition. When the addition is made continuous, in accordance with the invention, this water of esterification establishes an equilibrium in the reaction mixture, because the reaction is reversible. Oil can also be added to this mass if the rate of oil addition is not so great as to cause immiscibility with the partially esterified alkyd, due to high uncombined oil concentration, before it has had time to combine.

Assuming, in the present process, that the reaction has begun, and that the reaction vessel contains a homogeneous equilibrium mixture, oil is added to it slowly at the rate it is combining with the mixture. The rate of combination is determined by the temperature and by the concentration of uncombined oil in the mixture. Phthalic anhydride and glycerine or a partially esterified mixture of a compound of the two are added at such a rate that the formula remains constant. They combine with the free hydroxyl and carboxyl groups present to form oil modified alkyds of higher alkyd content than the average alkyd content of the reactive mass and at the same time water is liberated which, as pointed out, establishes an equilibrium at partial esterification. This equilibrium is well removed from the gel point of the oil-modified resin in the mixture.

In order to illustrate the invention in its simplest form, reference is had to the accompanying drawing which shows, diagrammatically, the arrangement of the various reaction vessels in which the continuous process of the present invention may be carried out. For illustrative purposes, the following materials, in the amounts indicated, were employed:

| | Pounds |
|---|---|
| Linseed oil (raw) | 480 |
| Phthalic anhydride | 360 |
| Glycerine | 160 |

The linseed oil is stored in vessel 1, which is calibrated in a suitable manner so that reference might be had at all times as to the amount of oil in the container and/or the rate of passage therefrom to reaction vessel 3, referred to more particularly hereinafter. The resin-forming components are stored in vessel 2, likewise appropriately calibrated.

In accordance with this specific example, the resin-forming component was prepared as follows: The glycerine and phthalic anhydride were combined by cooking at elevated temperatures to form the half-ester. The temperatures and time of this cooking operation may vary over a fairly wide range. In the present instance 160 lbs. glycerine and 360 lbs. phthalic anhydride were melted together at 260° F. The reaction was allowed to proceed without heat until a sample was clear when cold. The temperature was then raised to 350° F. and held fifteen minutes. The final product seems to be improved by longer cooking at 350° F. but the resin-forming component is not so easily handled due to its viscosity.

When cold this half-ester is a clear viscous material. In order to make it flow at room temperatures, the half-ester was diluted with water in the proportion of eighty parts water to the compound formed from three hundred sixty (360) parts phthalic anhydride and one hundred sixty (160) parts glycerine. The water content may be varied considerably to produce the proper fluidity. When other acids or alcohols are used, the temperatures, to give the proper combination, may vary somewhat. It is also possible to use acids which dissolve in a mixture of water and glycerine without combining them first under heat, as in this case.

Reaction vessel 3 was initially charged with a preformed linseed oil-modified phthalic anhydride glycerine resin. This preformed equilibrium mixture was prepared by adding oil and resin component manually to a small amount of modified alkyd prepared by the batch process until a sufficient quantity was obtained.

This preformed charge is heated in reaction vessel 3 by any convenient heating means H and held at a temperature of about 440° F. The average rate of addition is about thirty-one (31) ounces of the total raw materials shown in the above formula during one hour to one hundred (100) ounces of material in reaction vessel 3. At the indicated ingredient addition rate and temperature, the mass is in the state of ebullition, no artificial agitation is necessary, and a physically homogeneous mixture is continuously maintained. The reaction mixture formed in reaction vessel 3 may be drawn off as formed, to be used directly as a varnish-modifying agent, as pointed out hereinbefore, or it may be drawn through the valve 4 into a second reaction vessel 5 where the reaction mixture is cooked at a temperature from 420° F. to 480° F. Heat is supplied by heating element H'. As indicated above, reaction vessels 3 and 5 are equipped with thermometers or other temperature indicating media T and T'. Naturally, the temperature to be maintained in reaction vessel 3 will depend upon the type of reactants employed. Generally speaking, the range of temperature will vary from 350° F. to 525° F., and preferably the mixture is held at temperatures from 375° F. to 475° F.

Reaction vessel 5 is also preferably equipped with agitating means and in the drawing this is shown as a tube 6 through which is passed an inert gas, such as carbon dioxide or nitrogen to effect agitation. The average cooking time in reaction vessel 5 is varied by adjusting the level of the reaction mixture therein in relation to the level of the mixture in reaction vessel 3. In this specific example, the level and volume of the material in reaction vessel 5 is about the same as the level and volume in reaction vessel 3, giving an average cooking time of approximately three hours. The final resin has an acid number of approximately 20 and may be drained off continuously through outlet 7. It has been found that the rate of addition of the materials to reaction vessel 3 may be varied considerably.

As shown in the drawing, reaction vessels 3 and 5 are shown open to the atmosphere and uninsulated. It is understood, of course, that these vessels could be closed and covered with heat-insulating material.

As previously pointed out generally, the partially reacted mass from vessel 3 may be transferred to a separate container and further cooked in a batch process to produce a final resinous product of low acid number.

A significant feature of the foregoing specific example resides in the fact that raw, i. e. unrefined linseed oil, may be successfully employed, in accordance with the continuous process of the present invention, to produce a homogeneous, oil-modified alkyd resin. It is well known to varnish makers that raw linseed oil "breaks" when heated above to temperatures around 400° F. and, under the conditions of batch processes now employed in making alkyd resins, "break" also separates, resulting in a product which is not homogeneous. It is also known that various resins and driers may keep the "break" from separating from raw oil when it is cooked with them and homogeneous varnishes may be thus produced from raw linseed oil. In the present process, the resin in reaction vessel 3 is such that, like the aforesaid resins and driers, it prevents "break" separating from the raw linseed oil entering reaction vessel 3. Thus, a homogeneous resin is produced from raw linseed oil in the present process.

In another specific example, the following components were reacted in substantially the same manner:

|  | Pounds |
|---|---|
| Phthalic anhydride | 220 |
| Maleic anhydride | 20 |
| Glycerine | 140 |
| Alkali refined soya bean oil | 620 |

In this example, the phthalic anhydride, maleic anhydride and glycerine were fed from vessel 2 while the alkali-refined soya bean oil was fed from vessel 1. In the preparation of the resin from these ingredients, a considerably longer time was consumed, it taking about seven and one-half hours to feed the mixture into the reaction vessel 3.

A resin was also prepared from the following raw ingredients:

|  | Pounds |
|---|---|
| Phthalic anhydride | 400 |
| Maleic anhydride | 40 |
| Glycerine | 280 |
| Alkali refined soya bean oil | 240 |

In this instance, the ratio of reacting materials provided a much more rapid process, enabling the feeding of one hundred (100) ounces of the reacting materials in about four hours.

In a still further specific example, a resin was formed from the following ingredients:

|  | Pounds |
|---|---|
| Tall oil (crude or refined) | 720 |
| Glycerine | 160 |
| Maleic anhydride | 120 |
| Water | 40 |

The glycerine and maleic anhydride were heated together with stirring at 200° F. until reaction starts. After completion of the reaction the water was stirred into a clear liquid which was used as the resin component. Tall oil was proportioned in as the oil component.

The continuous process of the present invention is not, of course, limited in procedural detail or otherwise to the specific examples set forth herein. The invention, in other words, is applicable to oil-modified alkyd resin production generally. For instance, the oil component may be either raw or blown linseed oil or it may be heat-bodied or alkali refined linseed oil. Other oils suitable in the practice of the present invention are China-wood oil, dehydrated castor oil, soya bean oil, tall oil and various fish oils. Likewise, the invention is in no sense limited to the use of any particular acid or anhydride or to any particular alcohol. For instance, the following acids or anhydrides, or mixtures thereof, have been found useful: maleic, malic, fumaric, citric, tartaric, succinic, adipic and sebacic. When unsaturated dibasic acids or their anhydrides are employed, such as the maleic anhydride of the foregoing examples, it may be necessary, as indicated, to modify the general procedure as outlined herein by including, in the first reaction vessel, either a so-called diene acceptor, such as rosin or tall oil, or these unsaturated anhydrides may be diluted with a less reactive dibasic acid, such as phthalic acid, to aid in preventing gel formation in the equilibrium mixture.

The following alcohols, or mixtures thereof, have been found useful: glycerine, pentaerythritol, mannitol, ethylene glycol, diethylene glycol, propylene glycol and sorbitol. It has been found convenient to increase the viscosity of a formula, such as set forth in the first specific example herein, by replacing a portion of the glycerine with an equivalent amount of starch. In preparing the resin component for such a formulation the starch is dispersed in glycerine with heat before adding the dibasic acid.

It will also be understood, of course that the oil component may be modified, in some instances, by a partial reaction therewith of any of the acids indicated.

Furthermore, the resin-forming component may contain another resin, either preformed or in the component stage. For instance, there may be employed in this connection, a reactive phenol body formed by condensing a product known commercially as "Bis Phenol A" with formaldehyde in the presence of caustic at a comparatively low temperature, of the order of 120° F. and subsequently neutralizing with acid. The resultant product is a syrup consisting of mixtures of phenol alcohols. It condenses to an infusible resin on heating and can be combined with rosin to form an oil-soluble composition but is insoluble in oils or oil-modified alkyd resins. It is soluble in the resin-forming component of the present invention and, when so blended, can be combined with oil to form a phenol modified alkyd resin.

In some instances it may be found that the acid of the resin-forming component is not sufficiently water-soluble. In the case of fumaric acid, for instance, which is a fine powder quite insoluble in water, the continuous process of the present invention may be carried out by running a fine suspension of the fumaric acid and oil into reaction vessel 3 along with glycerine as the other component. In this instance, the glycerine may be somewhat diluted with water to make it run more freely.

The continuous process is likewise susceptible to other methods of component mixing. In the case of maleic acid, for instance, the process may be carried out in three different ways: (1) a liquid, half-ester may be prepared as described in connection with the phthalic-glyceride process or (2) there may be prepared a water solution of a physical mixture of maleic acid and glycerine and this may be combined with the oil or (3) glycerine may be run in as one component and a mixture of powdered maleic acid and oil run in as the second component.

It will also be understood that the ratio of oil component to resin-forming component may be varied between upper and lower limits depending upon several factors. The lower limit would be determined by a resin which could be cooked to a satisfactory acid number without polymerization, while the upper limit would be determined by an impractically slow reaction. The limits will vary both with the nature of the oil component and the nature of the resin-forming component. The rate at which combination takes place will also vary greatly not only with the ratio of the components but also with the composition of each component. Naturally, the degree of unsaturation or type of unsaturation of the oil employed will affect the rate of the combination.

I claim:

1. A process of combining fatty oil with alkyd resin-forming components, which comprises continuously intermingling the fatty oil with the alkyd resin-forming components at a constant rate and at an elevated temperature at substantially atmospheric pressure so as to maintain constant in the mass the relative proportions of the reactants and reaction products and to evolve water continuously at a constant rate, the rate of addition of components being such that homogeneity obtains at all times in the mass and the water evolved being continuously replaced at the rate at which it is evolved.

2. A process of combining fatty oil with alkyd resin-forming components, which comprises continuously intermingling the fatty oil with a free-flowing mixture of a polyhydroxy alcohol and a polycarboxylic acid at a constant rate and at an elevated temperature at substantially atmospheric pressure so as to maintain constant in the mass the relative proportions of the reactants and reaction products and to evolve water continuously at a constant rate, the rate of addition of components being such that homogeneity obtains at all times in the mass and the water evolved being continuously replaced at the rate at which it is evolved.

3. A process of combining fatty oil with alkyd resin-forming components, which comprises continuously intermingling the fatty oil with a mixture of glycerine and phthalic anhydride at a constant rate and at an elevated temperature at substantially atmospheric pressure so as to maintain constant in the mass the relative proportions of the reactants and reaction products and to evolve water continuously at a constant rate, the rate of addition of components being such that homogeneity obtains at all times in the mass and the water evolved being continuously replaced at the rate at which it is evolved.

4. A process of combining fatty oil with alkyd resin-forming components, which comprises continuously intermingling in one heating zone the fatty oil with the alkyd resin-forming components at a constant rate and at an elevated temperature at substantially atmospheric pressure so as to maintain constant in the mass the relative proportions of the reactants and reaction products and to evolve water continuously at a constant rate, the rate of addition of components being such that homogeneity obtains at all times in the mass and the water evolved being continuously replaced at the rate at which it is evolved, continuously transferring the reaction material so formed to a second heating zone, and continuously drawing off the oil-modified alkyd resin from said second heating zone.

5. A process of combining fatty oil with alkyd resin-forming components, which comprises continuously intermingling in one heating zone linseed oil with a mixture of glycerine and phthalic anhydride at a constant rate and at an elevated temperature at substantially atmospheric pressure so as to maintain constant in the mass the relative proportions of the reactants and reaction products and to evolve water continuously at a constant rate, the rate of addition of components being such that homogeneity obtains at all times in the mass and the water evolved being continuously replaced at the rate at which it is evolved, continuously transferring the reaction mixture so formed to a second heating zone, and continuously drawing off the oil-modified alkyd resin from said second heating zone.

6. A process of combining fatty oil with alkyd resin-forming components, which comprises continuously intermingling linseed oil with a mixture of a polyhydroxy alcohol and a polycarboxylic acid at a constant rate and at an elevated temperature at substantially atmospheric pressure so as to maintain constant in the mass the relative proportions of the reactants and reaction products and to evolve water continuously at a constant rate, the rate of addition of components being such that homogeneity obtains at all times in the mass and the water evolved being continuously replaced at the rate at which it is evolved.

7. A process of combining fatty oil with alkyd resin-forming components, which comprises continuously intermingling linseed oil with a half-ester of glycerine and phthalic anhydride at a constant rate and at an elevated temperature at substantially atmospheric pressure so as to maintain constant in the mass the relative proportions of the reactants and reaction products and to evolve water continuously at a constant rate, the rate of addition of components being such that homogeneity obtains at all times in the mass and the water evolved being continuously replaced at the rate at which it is evolved.

8. A process of combining fatty oil with alkyd resin-forming components, which comprises continuously intermingling a polyhydroxy alcohol and a suspension of a polycarboxylic acid in a fatty oil at a constant rate and at an elevated temperature at substantially atmospheric pressure so as to maintain constant in the mass the relative proportions of the reactants and reaction products and to evolve water continuously at a constant rate, the rate of addition of components being such that homogeneity obtains at all times in the mass and the water evolved being continuously replaced at the rate at which it is evolved.

9. A process of combining fatty oil with alkyd resin-forming components, which comprises continuously intermingling a polyhydroxy alcohol and a suspension of fumaric acid in a fatty oil at a constant rate and at an elevated temperature at substantially atmospheric pressure so as to maintain constant in the mass the relative proportions of the reactants and reaction products and to evolve water continuously at a constant rate, the rate of addition of components being such that homogeneity obtains at all times in the mass and the water evolved being continuously replaced at the rate at which it is evolved.

10. A process of combining fatty oil with alkyd resin-forming components, which comprises continuously intermingling a polyhydroxy alcohol and a suspension of maleic acid in a fatty oil at a constant rate and at an elevated temperature at substantially atmospheric pressure so as to maintain constant in the mass the relative proportions of the reactants and reaction products and to evolve water continuously at a constant rate, the rate of addition of components being such that homogeneity obtains at all times in the mass and the water evolved being continuously replaced at the rate at which it is evolved.

11. A process of combining fatty oil with alkyd resin-forming components, which comprises continuously intermingling fatty oil, glycerine and phthalic anhydride at a constant rate and at an elevated temperature at substantially atmospheric pressure so as to maintain constant in the mass the relative proportions of the reactants and reaction products and to evolve water continuously at a constant rate, the rate of addition of components being such that homogeneity obtains at all times in the mass and the water evolved being continuously replaced at the rate at which it is evolved.

12. A process of combining fatty oil with alkyd resin-forming components, which comprises continuously intermingling the fatty oil with the alkyd resin-forming components at a constant rate and at an elevated temperature so as to maintain constant in the mass the relative proportions of the reactants and reaction products and to evolve water continuously at a constant rate, the rate of addition of components being such that homogeneity obtains at all times in the mass and the water evolved being continuously replaced at the rate at which it is evolved.

EDWARD C. HAINES.